United States Patent [19]

Norin et al.

[11] 4,236,910
[45] Dec. 2, 1980

[54] METHOD OF BIOLOGICALLY DECOMPOSING ORGANIC MATERIAL, AND APPARATUS FOR CARRYING OUT THE METHOD

[75] Inventors: Åke Norin, Eskilstuna; Tore Nordlund, Torshälla, both of Sweden

[73] Assignee: Armerad Betong Vagforbattringar AB, Stockholm, Sweden

[21] Appl. No.: 3,395

[22] Filed: Jan. 12, 1979

[51] Int. Cl.³ .......................... C05F 11/06; C05F 7/00
[52] U.S. Cl. ............................................. 71/9; 210/620; 422/184; 71/12; 71/24; 435/287; 435/313
[58] Field of Search ................... 71/9, 12, 23, 24, 25, 71/26; 261/121 R; 210/15; 422/184, 187; 435/287, 313

[56] References Cited

U.S. PATENT DOCUMENTS 4,135,908  1/1979  Widmer .................................. 71/9

FOREIGN PATENT DOCUMENTS 350767  6/1931  United Kingdom ................ 261/121 R

*Primary Examiner*—William F. Smith
*Attorney, Agent, or Firm*—Fred Philpitt

[57] ABSTRACT

The invention is concerned with a method of biologically decomposing organic material by the action of microorganisms thereon in the presence of an oxygen-gas containing medium, in which method the material is charged to the top of a vessel and caused to sink downwardly therethrough while passing one or more zones during continuous decomposition of the material and discharge of the treated material at the bottom of said vessel, the oxygen-gas medium being charged to the bottom of the vessel and caused to move upwardly therethrough against the pressure of the overlying material, wherein the sinking movement of said material is effected by causing one or more rotatable screws to cut and finely-divide the treated material and to transport said cut and treated material to a discharge location in the lower part of the vessel; and wherein the oxygen-gas containing medium is introduced through gas-supply means in the bottom part of the vessel and caused to pass through a layer of particulate material and through a layer comprising a finely divided part of the treated organic material in a manner such that the said medium is uniformly distributed over the whole cross sectional area of the vessel prior to it being passed into the material undergoing said biological decomposition.

5 Claims, 1 Drawing Figure

U.S. Patent
Dec. 2, 1980
4,236,910
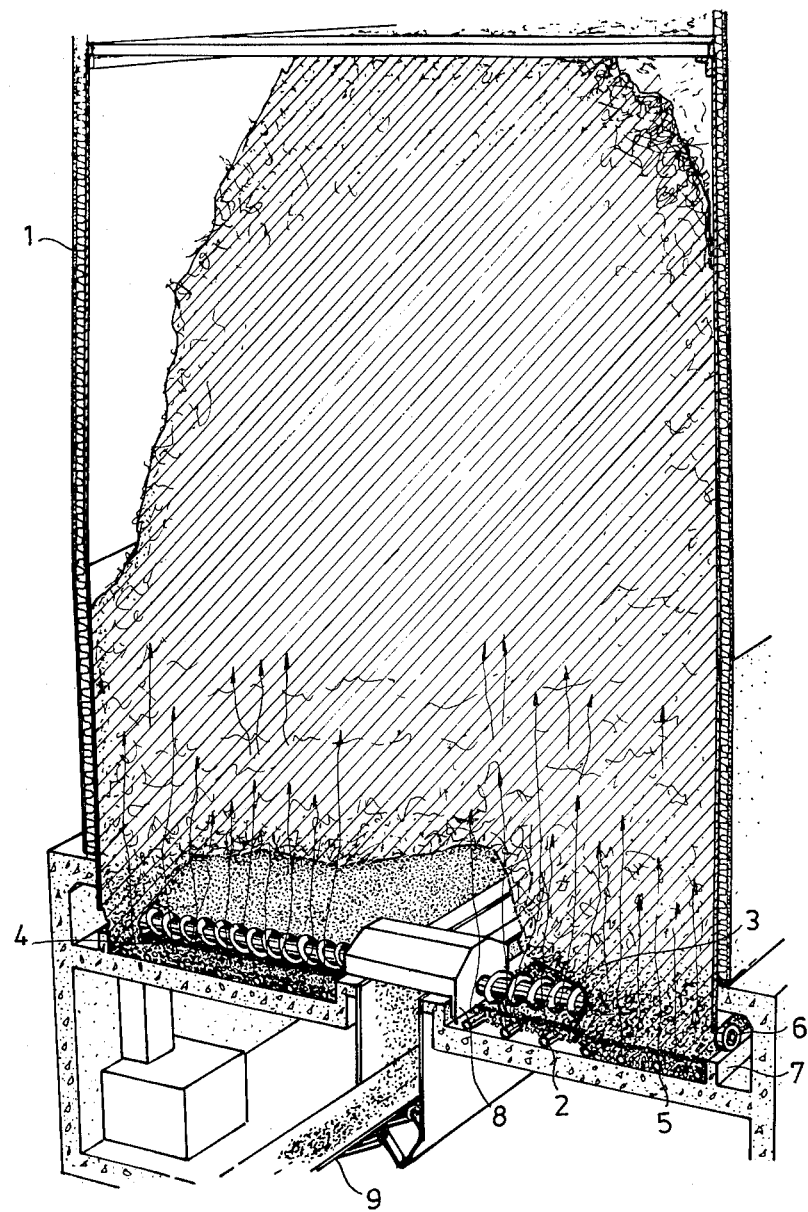

METHOD OF BIOLOGICALLY DECOMPOSING ORGANIC MATERIAL, AND APPARATUS FOR CARRYING OUT THE METHOD

The present invention relates to a method of biologically decomposing organic material. More particularly the invention relates to a method of rotting organic material biologically by the action of microorganisms thereon in the presence of an oxygen gas-containing medium such as air. When practising the method, material to be decomposed is charged to the top of a vessel and caused to sink therethrough, to pass through one or more zones whilst continuously decomposing, and is discharged from said vessel at the bottom thereof, the medium containing said oxygen gas being charged to the bottom of the vessel and caused to move up through said vessel against the pressure of the overlying material.

Such a method is previously known in the art. In the known method, the space at the bottom of the vessel to which the medium containing said oxygen gas is charged has a relatively small cross-sectional area. As a result hereof it has not been possible to construct vessels of a sufficiently large volume, since to a great extent the volume of the vessel is restricted by the maximum height which the vessel may have in order for the oxygen-gas containing medium, which is preferably air, to be passed up through the material being decomposed in the vessel without requiring excessive energy heretofore. The object of the present invention is to enable the oxygen-gas containing medium, preferably air, to be charged to the vessel over a relatively wide surface area, one condition being that the air shall be uniformly distributed over said surface prior to being caused to pass into the mass undergoing decomposition.

The problem is solved in accordance with the invention by the fact that the material is caused to sink through the container with the aid of one or more rotatable screws which are arranged to mill or cut off part of the treated material from the main body of said material and to finely divide this cut-off portion and to transport said material to a discharge location in the lower part of the vessel; and by the fact that the medium containing oxygen-gas is introduced through gas-distributing devices arranged in the lower part of the vessel and caused therewith to pass through a layer of particulate material and through a layer of finely-divided treated material in a manner such that said medium is uniformly distributed over the whole cross sectional area of the vessel prior to it being introduced into the material undergoing decomposition.

It is also known for the vessel used to have a circular cross section. The use of such vessels in particular is encumbered with the disadvantage that said vessel cannot be given a sufficiently large volume, since the height of the decomposing material moving downwardly through the vessel is restricted by the highest resistance which the oxygen-containing medium charged to the bottom of said vessel meets during its movement upwardly therethrough. A circular vessel for the intended purpose cannot be given a cross-sectional area of any magnitude whatsoever, since the difficulties encountered in distributing the oxygen-gas containing medium uniformly over the whole of the cross section of the circular vessel increases with an increasing cross-sectional area.

The aforementioned disadvantage can be overcome or substantially overcome when the vessel in which the continuous decomposition of the material is carried out has the form of a four-sided figure, such as a rectangular figure, and preferably an oblong. The desired uniform distribution of the oxygen-gas containing medium, which is preferably air, introduced in one and the same region of the vessel, is ensured, or at least practically ensured, by causing in a manner known per se one or more rotary screws to move forwards and backwards between two mutually opposite sides of said four-sided vessel, at the bottom of said vessel, i.e. in the zone where the decomposed material is discharged from the vessel. At the same time as there is obtained a suitable mixing of the decomposed material in the neighbourhood of the discharge opening, there is also obtained a uniform transport of the material to said opening.

The organic material treated may comprise any form of waste material, e.g., domestic waste, organic waste from industries, possibly dehydrated sludge from sewage purification plants, etc., although other organic material such as peat and similar fossilized material can be envisaged. In order for conversion to compost to take place in a trouble-free manner, a so-called carbon-carrier is normally added to the sludge. Examples of such carbon-carriers include sawdust, treebark, straw, peat, etc. The waste material, for example sludge, is normally mixed with the carbon-carrier by means of a mixing screw, in a ratio of between 5:1 and 15:1, preferably between 7:1 and 12:1. For example, the mixing ratio may be 10:1. The mixture of waste and carbon-carrier, when such a carrier is used, is introduced to a vessel at the top thereof and caused to sink downwardly in said vessel whilst meeting oxygen-gas containing medium charged to the vessel at the lower part thereof, said medium being preferably air. As the mixture of waste and carbon-carrier move downwardly in the vessel, it enters a zone in which thermophilic bacteria are active and generate a relatively high temperature, which may be as high as 80° C. It is important that the material is caused to stay in this thermophilic zone long enough for illness-creating microorganisms, parasitic eggs and seeds to be completely destroyed. The residence time of the material in the vessel may be approximately 14 days. The humus like material discharged from the vessel can be readily handled and has no disturbing odour. After being stored outdoors for some weeks, for example 6 to 8 weeks, the material can be used as an earth-improving material.

Uniform distribution of the oxygen-gas containing medium, preferably air, is ensured by means of a screw which is caused to move in the bottom of the vessel in the aforedescribed manner. In turn, there is ensured in this way the formation of the thermophilic zone in the form of a layer which extends over the whole of the cross sectional area of the vessel. Consequently, there is a minimum of risk that material passing down through the vessel will be insufficiently treated with respect ot the distruction of deleterious microorganism, parasite eggs and seeds.

The rotary screw or screws is or are caused to move in the horizontal plane parallel with the axis of rotation of said screw or screws, and to transport material out towards one end of the screw or screws or towards both ends thereof.

The invention also relates to an apparatus for biologically decomposing organic material by the action of microorganisms thereon in the presence of a medium containing oxygen-gas, said apparatus comprising a vessel having an input location for organic material at the top of said vessel and a discharge location for treated material at the bottom thereof, and means for supplying said oxygen-gas containing medium to the bottom of said vessel. The invention is characterized in that one or more rotatable screws is or are arranged in a horizontal plane on a level above that at which the means for supplying said medium to the bottom of said vessel are located, said screw or screws being arranged to cut-off the treated material and convey said material to the discharge location; and in that the means for supplying said medium are covered by or embedded in a particulate material, a space being provided between the upper side of the layer of particulate material and said horizontal plane in which the screw or screws is or are arranged, said space being connected to the discharge location for treated material and, during operation of the apparatus, being filled with material cut by the screw or screws into a finely divided state in the form of a layer which together with the layer of particulate material contributes to uniformly distribute the oxygen-gas medium introduced into the vessel over the cross-sectional area thereof.

According to the invention the vessel may have the shape of a four-sided figure when seen in cross section and the screw or screws may be arranged to move in a horizontal plane between two mutually opposing sides of the four-sided vessel.

In accordance with one embodiment of the invention, the vessel may have a rectangular cross sectional shape, such as an oblong and the screw or screws may be arranged to move backwards and forwards in a horizontal plane between the short sides of said oblong.

So that the invention will be more readily understood and optional features thereof made apparent, an exemplary embodiment of the invention will not be described with reference to the accompanying drawing, the single FIGURE of which illustrates schematically and in perspective an apparatus for carrying out the method of the invention.

In the FIGURE there is illustrated a vessel 1 of rectangular cross sectional shape, of which vessel one wall has been removed so that the elements arranged in the vessel can be seen. The vessel is intended for the biological decomposition of sludge obtained from sewage purification works. To this end, the sludge is mixed with a carbon carrier, such as sawdust, and the vessel is filled from the top thereof with material which undergoes in the vessel biological decomposition in different temperature zones. Arranged at the bottom of the vessel 1 are pipes 2 through which air is introduced into the vessel, the air being caused to rise upwardly through the vessel against the pressure exerted by the overlying material. When the air comes into contact with the mixture of sludge and carbon carrier, microorganisms present in the sludge are activated and rapidly increase in number as the organic material is decomposed. As the material mixture moves down through the vessel the temperature of the mixture rises to values of a magnitude such as to kill illness-causing microorganisms while the thermophilic organisms, particularly bacteria, continue to multiply and to participate in the process of decomposition.

In order to cause the material in the vessel to sink downwardly therethrough, there are arranged in the bottom portion of the vessel rotatable screws 3 which are arranged to move forward and backward between two sides of the foursided vessel. In the position illustrated, the screws 3 are located in their one limit position. When rotating, the screws act both as a milling device for cutting away a layer of the treated material in the bottom portion of the vessel 1 and as means for conveying the thus severed and finally divided material to a discharge location not shown in the FIGURE. The cut material is collected in a space located beneath the plane of movement of the screws. In the drawing this space is referenced 4. In the space 4 the mass of finely divided material rests on a layer 5 of particulate material, such as a layer of coarse gravel or shingle covering the pipes 2 through which the air required for the decomposition of the material is passed into the vessel. As a result of the combination of the layer 5 comprising coarse particles and the layer 4 comprising finely-divided treated material, the air required for the decomposing process is effectively distributed uniformly over the whole of the cross sectional area of the vessel 1. This enables a vessel of very high volumetric capacity to be constructed, whilst the height of the vessel need not be greater than that which will enable the air to be forced through the layer of material being treated located above the screws with a reasonable amount of energy input.

Each of the ends of the screws are provided with rollers 6, only one such roller being shown in the drawing. The rollers rest against rails 7 which guide the screws during their forward and backward movement between the side of the vessel. Both the rotary and the reciprocating movement of the screws are obtained by means of a motor (not shown) housed in a housing 8. The material cut from the main body of the material in the vessel and finally divided by the screws is discharged through a discharge opening (not shown) onto a conveyor 9 for conveyance to a storage site.

What is claimed is:

1. An apparatus for biologically decomposing organic material by the action of microorganisms thereon in the presence of a medium containing an oxygen-gas, said apparatus comprising:
   (a) a vessel having four upstanding side walls to laterally contain a mass of organic material,
   (b) a first inlet adjacent the top of said vessel for the introduction of organic material,
   (c) an outlet adjacent the bottom of said vessel for the removal of treated organic material,
   (d) a second inlet adjacent the bottom of said vessel for the introduction of a medium containing oxygen gas,
   (e) at least one rotatably screw located in a horizontal plane within the interior of said vessel adjacent the bottom thereof but at a higher level than said second inlet, each said screw being adapted to cut material from the bottom of the organic mass that gravitates downwardly through said vessel and to convey the cut material to said outlet,
   (f) a layer of coarse particulate covering said second inlet and extending in a generally first horizontal plane,
   (g) means for moving each said rotatable screw back and forth between two non-adjacent side walls of said vessel in a second horizontal plane that is parallel to said first horizontal plane and above it,
   (h) a horizontally extending space between the upper surface of said layer of particulate material and the lower sweep of said at least one rotatable screw, said space communicating with said outlet and which, when the apparatus is in use, is filled with finely divided organic material cut by said at least one screw in the form of a layer, which together with the said layer of coarse particulate material contributes to uniformly distributing the oxygen-gas containing medium over the cross sectional area of the vessel.

2. In the method of biologically decomposing organic material by the action of microorganisms thereon in the presence of a medium containing oxygen gas, in which method the organic material is charged to the top of a vessel in the form of an organic mass that is caused to sink downwardly therethrough during the course of progressive decomposition that is assisted by the flow of an oxygen gas medium that is introduced near the bottom of the vessel and caused to flow upwardly through the organic mass, the improvement which comprises (a) causing the sinking movement of the organic mass by disposing at least one rotatable screw adjacent the bottom of the mass, said at least one rotatable screw is cause to move back and forth across the bottom of said vessel in a generally horizontal plane, which screws cut and finely divide the treated organic mass and transport it to a discharge location in the lower part of the vessel, (b) causing the oxygen-gas medium introduced adjacent the bottom of the vessel to first flow through a layer of particulate material and then through a layer of treated organic material in such a manner that said oxygen gas medium is more uniformly distributed over the whole cross sectional area of the vessel prior to its passing upwardly through the organic mass undergoing biological decomposition.

3. The method according to claim 2 wherein said organic material is sludge obtained from a sewage purification works.

4. The method according to claim 2 wherein said organic material is peat.

5. The method according to claim 2 wherein said particulate material is coarse gravel or shingle.

* * * * *